United States Patent
Moeglich

(10) Patent No.: US 11,723,502 B2
(45) Date of Patent: Aug. 15, 2023

(54) SUCTION NOZZLE FOR A HANDHELD MILLING MACHINE

(71) Applicant: Hilti Aktiengesellschaft, Schaan (LI)

(72) Inventor: Tobias Moeglich, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 718 days.

(21) Appl. No.: 16/619,027

(22) PCT Filed: May 28, 2018

(86) PCT No.: PCT/EP2018/063913
§ 371 (c)(1),
(2) Date: Dec. 3, 2019

(87) PCT Pub. No.: WO2018/224348
PCT Pub. Date: Dec. 13, 2018

(65) Prior Publication Data
US 2020/0146522 A1    May 14, 2020

(30) Foreign Application Priority Data
Jun. 6, 2017  (EP) .................................... 17174488

(51) Int. Cl.
*A47L 9/24*  (2006.01)
*A47L 9/02*  (2006.01)
*B23Q 11/00* (2006.01)

(52) U.S. Cl.
CPC .................. *A47L 9/242* (2013.01); *A47L 9/02* (2013.01); *B23Q 11/0046* (2013.01)

(58) Field of Classification Search
CPC ............ B23Q 11/0046; B23Q 11/0071; B23Q 11/0075; Y10T 409/30672; B23B 2270/62; A47L 9/242; A47L 9/02; B25F 5/003

(Continued)

(56) References Cited

U.S. PATENT DOCUMENTS 2,951,714 A * 9/1960 Reinhold ................ A47L 9/242
                                                  285/317
4,184,226 A * 1/1980 Loevenich ......... B23Q 11/0067
                                                  408/67

(Continued)

FOREIGN PATENT DOCUMENTS

| DE | 10342515 | 5/2005 |
| JP | S4968072 U | 6/1974 |
| JP | H0667007 U | 9/1994 |

OTHER PUBLICATIONS

International Search Report of PCT/EP2018/063913, dated Sep. 10, 2018.

*Primary Examiner* — Anne M Kozak
*Assistant Examiner* — Robert C Moore
(74) *Attorney, Agent, or Firm* — Davidson, Davidson & Kappel, LLC

(57) ABSTRACT

A suction nozzle (100) for a hand-held milling machine (200), the suction nozzle (100) including a suction connection (30) designed for connection to a dust extraction system (300), and the hand-held milling machine (200) being equipped with a depth stop (210), with the aid of which a penetration depth (ET) of a milling tool (220) of the hand-held milling machine (200) may be limited, the suction nozzle (100) having a connection area (10), via which the suction nozzle (100) is detachably fastenable, in particular detachably fastenable without tools, to the depth stop (210).

17 Claims, 5 Drawing Sheets

(58) Field of Classification Search
USPC .................................................. 409/137, 134
See application file for complete search history.

(56) References Cited

U.S. PATENT DOCUMENTS

| | | | | |
|---|---|---|---|---|
| 5,688,082 A | * | 11/1997 | Richardson | B23Q 16/001 |
| | | | | 409/137 |
| 6,053,651 A | * | 4/2000 | Tokuwa | H01R 13/743 |
| | | | | 403/329 |
| 7,063,606 B2 | * | 6/2006 | Stierle | B24B 55/052 |
| | | | | 451/454 |
| 2002/0187014 A1 | * | 12/2002 | Bergner | B23Q 35/42 |
| | | | | 409/182 |
| 2003/0223836 A1 | * | 12/2003 | Pozgay | B25H 1/0078 |
| | | | | 409/182 |
| 2006/0153650 A1 | | 7/2006 | Simm et al. | |
| 2008/0277919 A1 | * | 11/2008 | Valentini | F16L 27/0849 |
| | | | | 285/7 |
| 2010/0170538 A1 | | 7/2010 | Baker et al. | |
| 2014/0093320 A1 | | 4/2014 | Sullivan et al. | |

\* cited by examiner

SUCTION NOZZLE FOR A HANDHELD MILLING MACHINE

The present invention relates to a suction nozzle for a hand-held milling machine, the suction nozzle including a suction connection designed for connection to a dust extraction system, and the hand-held milling machine being equipped with a depth stop, with the aid of which a penetration depth of the milling tool of the hand-held milling machine may be limited.

BACKGROUND

Suction nozzles of this type are generally known from the prior art. The use of a hand-held milling machine usually generates an amount of dust, in particular when processing mineral materials that must be extracted via a suction nozzle, which is to be connected to a dust extraction system. Suction nozzles are typically mounted near a milling tool to receive a large portion of the dust.

SUMMARY OF THE INVENTION

It is an object of the present invention to provide a suction nozzle, which favors an easy and safe operability.

The present invention provides that the suction nozzle has a connection area, via which the suction nozzle is detachably fastened, preferably detachably fastened without tools, on the depth stop.

The present invention includes the finding that suction nozzles according to the prior art are awkward to mount on a hand-held milling machine or to be detached therefrom. A special tool is typically necessary. Due to the usually awkward mounting of the suction nozzle on the hand-held milling machine, an extraction of the dust is frequently dispensed with entirely, which may result in a health impairment of the user.

Due to the fact that the suction nozzle according to the present invention is detachably fastened, in particular detachably fastened without tools, to the depth stop, an awkward mounting is avoided and an undesirable dispensing of the extraction is ultimately avoided.

The present invention furthermore includes the finding that suction nozzles according to the prior art, which are fixedly mounted on the hand-held milling machine, may break off more easily and, in particular, become damaged by a hand-held milling machine, including the nozzle, falling to the ground. The suction nozzle according to the present invention establishes a basis for avoiding this disadvantage as well.

In one particularly preferred embodiment, at least one latching element is formed on the connection area, which is preferably in engagement with a corresponding latching element when the connection area is fastened to the depth stop.

It has proven to be advantageous if the latching element is designed as a latching tab and the corresponding latching element as a recess. The interaction between the latching element designed as a latching tab and the corresponding latching element designed as a recess makes it possible to implement a fastening system in the form of a snap lock. The pairing of the latching element and corresponding latching element may be dimensioned in such a way that the latching connection is released when a latching force is exceeded. A latching force of this type may occur, for example when the system made up of the suction nozzle and hand-held milling machine strikes the ground. In this case, the suction nozzle would be released from the hand-held milling machine upon striking the ground, whereby the probability of a damage to the suction nozzle is reduced.

It has proven to be advantageous if the connection area is provided with an annular design, preferably in such a way that the connection area surrounds the milling tool or a receiving spindle in an annular manner or is at least situated coaxially to the milling tool or the receiving spindle when the connection area is fastened to the depth stop. An optimal dust extraction around the milling tool may be implemented hereby.

It has also proven to be advantageous if two opposite latching elements are formed on the annular connection area, and/or at least two corresponding latching elements are formed on the depth stop. Exactly two latching elements, which are situated opposite each other and are preferably diametrically opposed to each other, are preferably formed on the annular connection area.

Four corresponding latching elements are preferably formed on the depth stop of the milling tool. They may each be designed as recesses and/or be preferably situated equidistantly apart along the circumference of a preferably annular depth stop. This has the advantage that the suction nozzle may be situated in different positions or orientations on the depth stop of the hand-held milling machine.

In one particularly preferred embodiment, a first of the latching elements is rigidly formed in the connection area and/or a second of the latching elements is elastically formed in the connection area with the aid of a spring element.

The spring element is preferably situated outside the annular connection area in the direction of the suction connection.

The latching force mentioned at the outset may be defined by a corresponding dimensioning of the spring element. At the same time, the second of the latching elements elastically formed on the connection area may be displaced by manually actuating the spring element, for example by pressing it with the thumb, and the suction nozzle may thus be particularly easily and comfortably released from the depth stop of the hand-held milling machine.

In another particularly preferred embodiment, at least one pressure compensation opening is provided on the outer circumference of the annular connection area. Multiple pressure compensation openings may be provided, which are situated along the outer circumference. Exactly two pressure compensation openings are preferably provided, which are situated on the side of the annular connection area facing away from the suction connection.

It has proven to be advantageous if the suction nozzle is made from, or at least includes, a transparent plastic. The flow within the suction nozzle may be observed in this way, and any blockages may be detected at an early stage. Moreover, the working position is visible to the user due to the use of a transparent plastic, whereby a more precise work is facilitated.

The present invention is also achieved by a milling system, including a hand-held milling machine, which has a depth stop, with the aid of which a penetration depth of a milling tool of the hand-held milling machine may be limited, and including a suction nozzle of the type described above.

The depth stop of the hand-held milling machine is preferably detachably fastened or fastenable without tools to the hand-held milling machine.

Due to the fact that the suction nozzle is fastened to the depth stop, and the depth stop itself is quickly and easily detachable from the hand-held milling machine with the aid of the screw connection, the suction nozzle, together with the depth stop, may also be quickly and easily removed from the hand-held milling machine. This is particularly useful in the case of fine work, if the user wants to briefly mill a small piece and neither the depth stop nor the suction nozzle is needed. The suction nozzle and depth stop may thus be removed together and also reconnected to the hand-held milling machine.

The present invention is also achieved by a hand-held milling machine, which includes a depth stop, with the aid of which a penetration depth of a milling tool of the hand-held milling machine may be limited, a corresponding latching element in the form of a recess being formed on the depth stop. The hand-held milling machine according to the present invention may be refined by the features described with respect to the upper exemplary embodiments.

Other advantages result from the following description of the figures. The figures illustrate different exemplary embodiments of the present invention. The figures, the description and the claims contain numerous features in combination. Those skilled in the art will advantageously also consider the features individually and combine them to form other reasonable combinations.

BRIEF DESCRIPTION OF THE DRAWINGS

In the figures, identical and equivalent components are provided with identical reference numerals.

DETAILED DESCRIPTION

Figure 1:
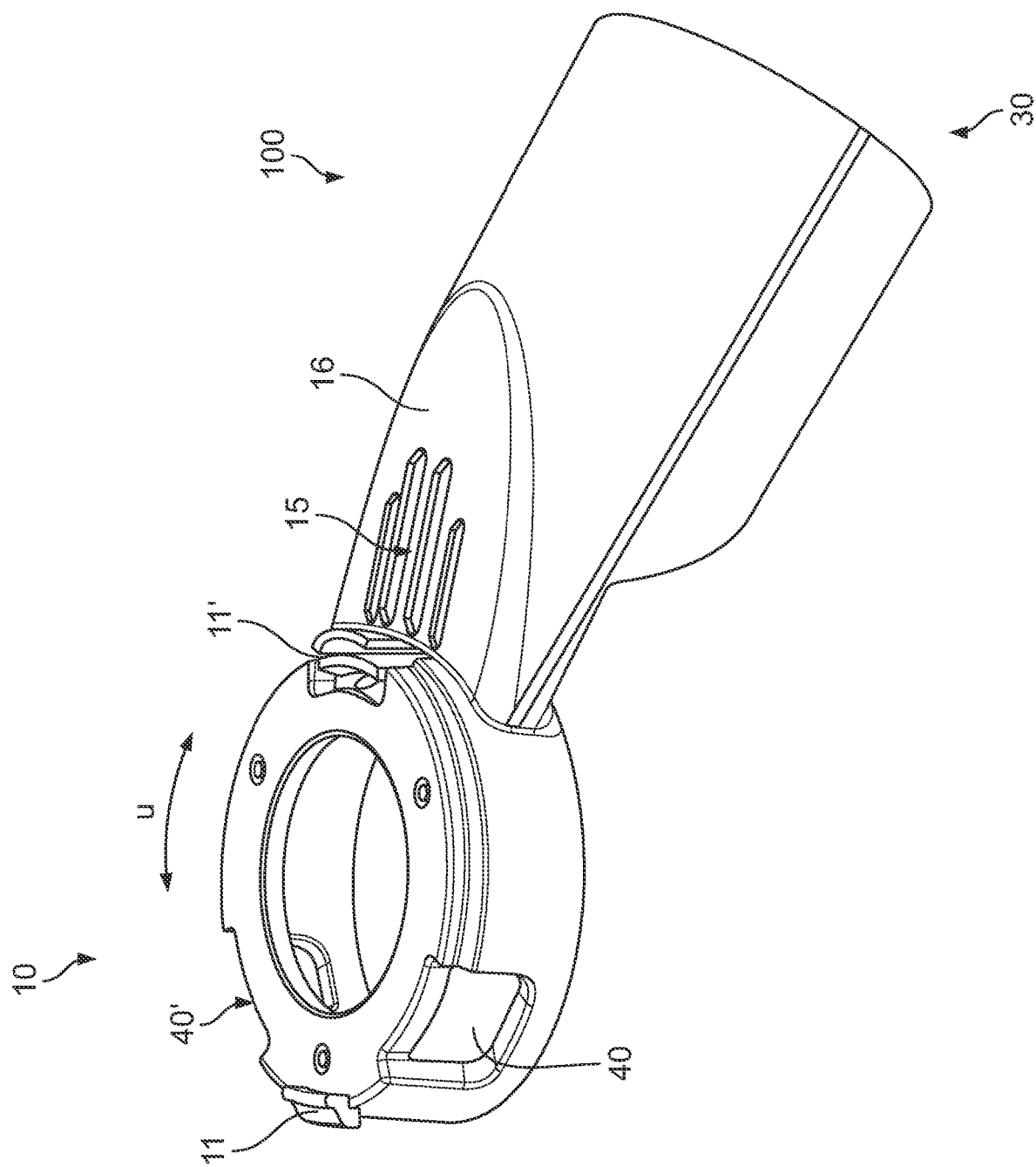
FIG. 1 shows a preferred exemplary embodiment of a suction nozzle according to the present invention.

A preferred exemplary embodiment of a suction nozzle 100 according to the present invention is illustrated in FIG. 1. Suction nozzle 100 is destined for connection to a hand-held milling machine 200 (cf. FIG. 2). Suction nozzle 100 includes a suction connection 30 designed for connecting a dust extraction system 300 (cf. schematic representation in FIG. 3). Suction nozzle 100 has a connection area 10, via which suction nozzle 100 is detachably fastenable without tools to a depth stop 210 (cf. FIG. 2).

Figure 3:
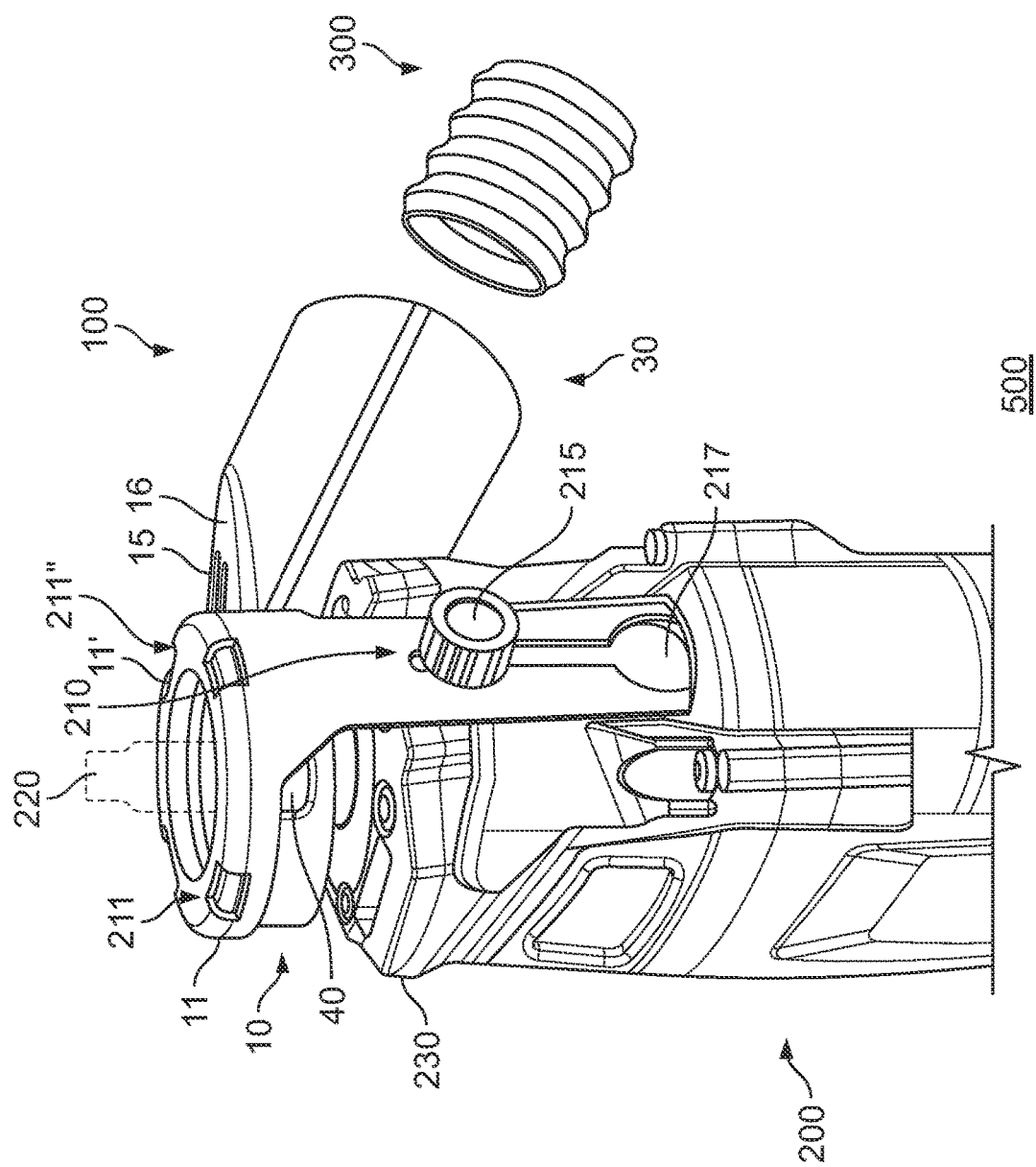
FIG. 3 shows the system from FIG. 2, the suction nozzle being situated on a depth stop of the hand-held milling machine.

In the exemplary embodiment in FIG. 1, connection area 10 is provided with an annular design in such a way that connection area 10 surrounds a milling tool 220 (cf. FIG. 3) in an annular manner when connection area 10 is fastened to depth stop 210, as shown in FIG. 3.

A first latching element 11 and a second latching element 11' are formed in connection area 10 of suction nozzle 100. Exactly two latching elements 11, 11' are thus provided, which are designed as latching tabs. Latching elements 11, 11' designed as latching tabs are situated diametrically opposed to each other on annular connection area 10.

It is clearly apparent that the first of latching elements 11 is rigidly formed on connection area 10. The second of latching elements 11' is elastically formed on connection area 10 with the aid of a spring element 15.

Suction nozzle 100 illustrated in FIG. 1 is manufactured entirely from a transparent plastic. Spring element 15 is thus designed as a fixed joint in a transition area 16 between suction connection 30 and connection area 10. As is apparent from FIG. 1, transition area 16 is provided with an essentially planar design.

Two pressure compensation openings 40, 40' are provided along outer circumference U of annular connection area 10, which favor an improvement of the air flow during extraction.

Figure 2:
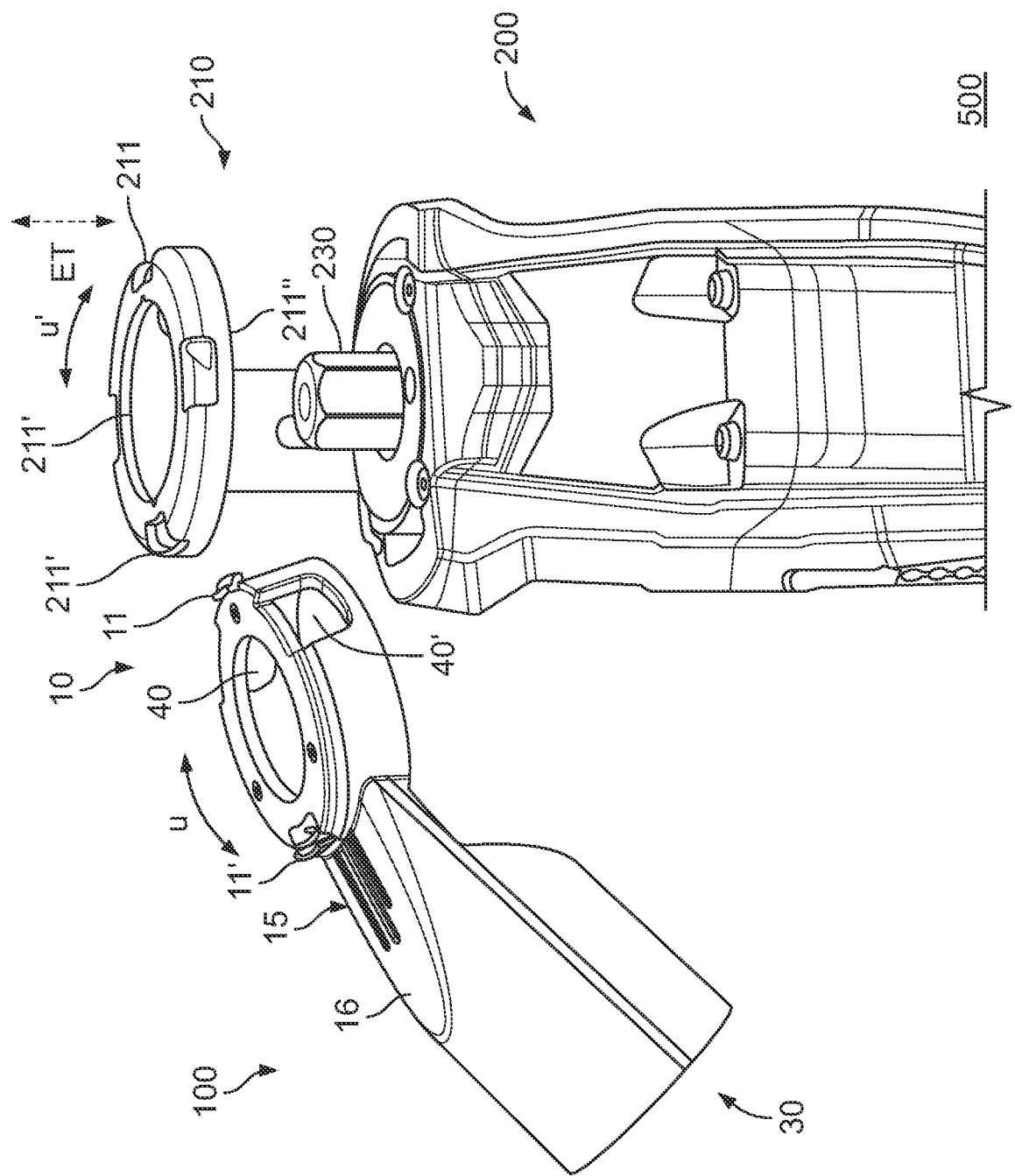
FIG. 2 shows a system made up of the suction nozzle and hand-held milling machine.

FIG. 2 shows a milling system 500, including a hand-held milling machine 200, which has a depth stop 10, with the aid of which a penetration depth ET of a milling tool, which is not illustrated, of hand-held milling machine 200 may be limited. Suction nozzle 100 illustrated in FIG. 1 is part of milling system 500.

It is clearly apparent in FIG. 2 that latching elements 11, 11' formed on connection area 10 are destined to be in engagement with corresponding latching elements 211, 211', 211", 211''' of depth stop 210 when connection area 10 is fastened to depth stop 210 (cf. FIG. 3).

As already discussed with reference to FIG. 1, connection area 10 of suction nozzle 100 is provided with an annular design and includes two latching elements 11, 11', which are each designed as latching tabs. Latching elements 211, 211', 211", 211''' corresponding to these latching elements 11, 11' designed as latching tabs are designed as recesses, which are situated along the also annular depth stop 210 in circumferential direction U'. Since two latching tabs are provided on connection area 10 and four recesses are provided on depth stop 210, suction nozzle 100 may be situated on depth stop 210 in four different orientations. This permits a particularly flexible use.

FIG. 3 now shows suction nozzle 100 in the state situated on hand-held milling machine 200. In this view, it is clearly apparent that depth stop 210 is detachably fastened without tools to hand-held milling machine 200 via a screw connection 215.

If depth stop 210 illustrated in FIG. 3 is displaced into its upper position, screw connection 215 may be guided through a screw hole 217, and depth stop 210 may thus be removed from hand-held milling machine 200. If, as illustrated in FIG. 3, suction nozzle 100 is fastened to depth stop 210, suction nozzle 100 is also removed from hand-held milling machine 200 upon removal of depth stop 210.

It is also clearly apparent in FIG. 3 that pressure compensation opening 40 is not covered by depth stop 210, at least in sections, so that a good suction behavior is favored.

Figure 4:
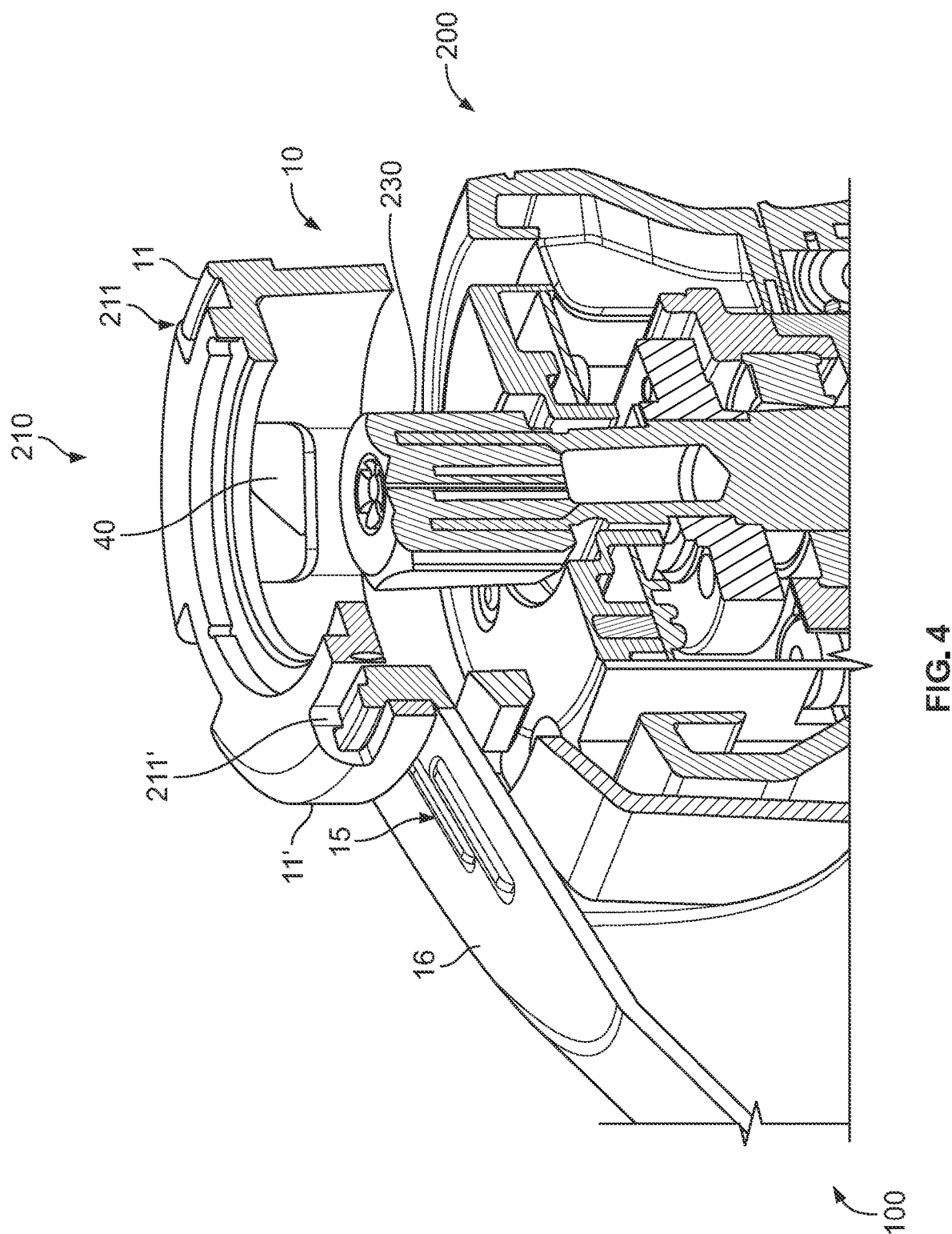
FIG. 4 shows a sectional view of the representation in FIG. 3.

A sectional representation of suction nozzle 100 and depth stop 210 is illustrated in FIG. 4. This is used, in particular, to explain how latching elements 11, 11" provided in the form of latching tabs interact with corresponding latching elements 211, 211', which are provided as recesses in depth stop 210, in the form of a snap lock.

FIG. 4 shows the mounted state of suction nozzle 100, in which first latching element 11 rigidly formed on connection area 10 and second of latching elements 11', which is elastically formed on connection area 10 with the aid of a spring element 15, are engaged with corresponding recesses. By applying a force onto spring element 15, for example with the aid of the thumb, second of latching elements 11' may be moved downward and thus moved out of corresponding latching element 211'. Suction nozzle 100 is released from depth stop 210 thereby.

The same is the case if, for example, hand-held milling machine 200, together with situated suction nozzle 100, falls to the ground. In this case, spring element 15 would be deflected by the impact force and release the snap lock formed by two latching tabs and two corresponding recesses. A breaking off of connection area 10 of the suction nozzle would thus be avoided. It is clearly apparent that spring element 15 is situated outside annular connection area 10 in the direction of suction connection 30.

Figure 5:
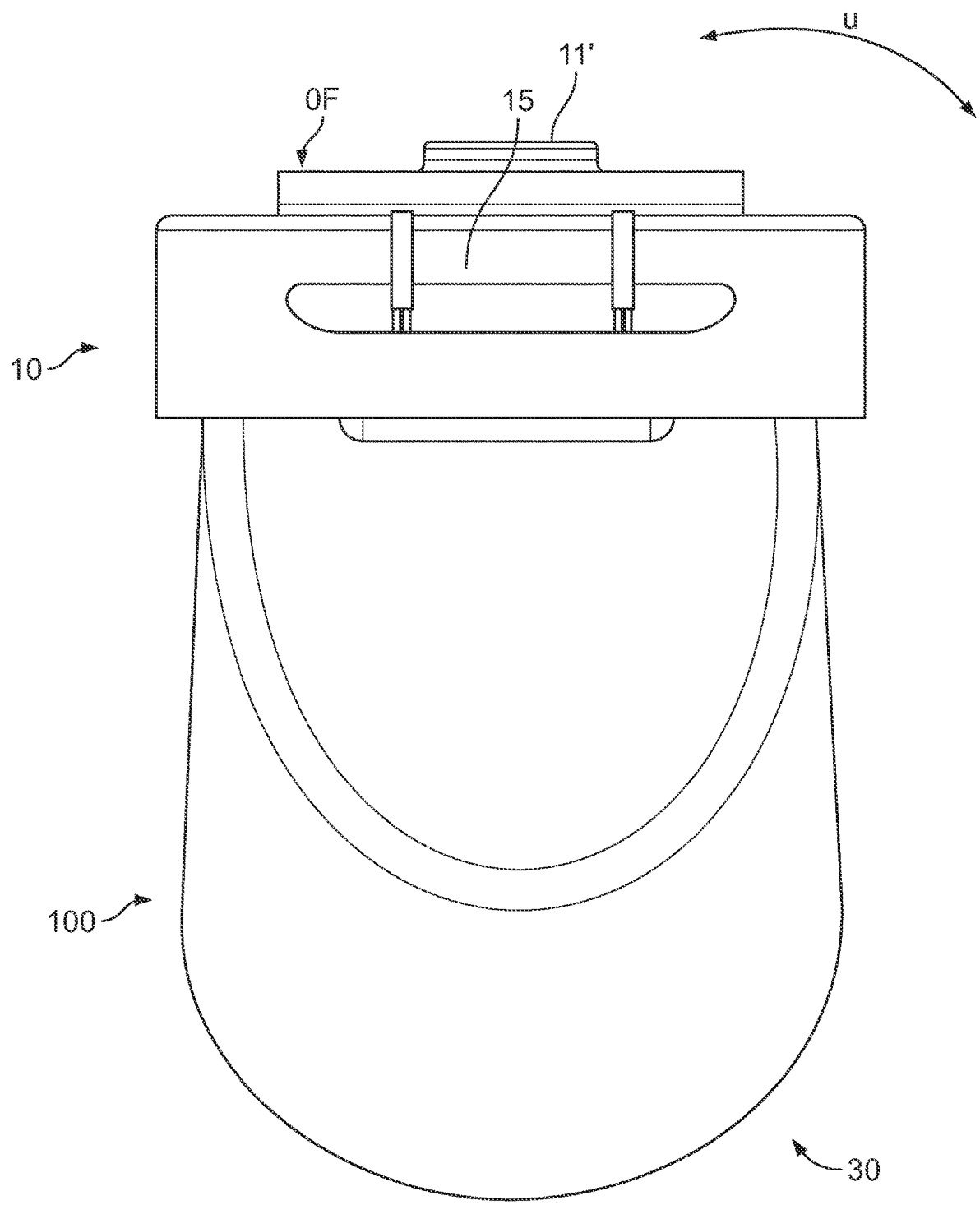
FIG. 5 shows a sectional view of the suction nozzle in FIG. 1.

Finally, FIG. 5 shows a sectional representation of a suction nozzle 100. In the lower area, it is clearly apparent that suction connection 30 is to be connected to a dust extraction system, which is not illustrated here, via suction nozzle 100. As is apparent from FIG. 5, the second of latching elements 11', which is designed as a latching tab, projects over a surface OF, which faces away from suction connection 30. In the sectional representation, it is clearly apparent that spring element 15 is formed in annular connection area 10. It virtually forms an interruption in sections of annular connection area 10. A slight deflection of spring element 15 in circumferential direction U is thus also possible. This makes it easier to release the snap lock already described at the outset, which is functionally formed by the latching tab and recess.

LIST OF REFERENCE NUMERALS 10 connection area
11, 11' latching element
15 spring element
16 transition area
30 suction connection
40, 40' pressure compensation opening
100 suction nozzle
200 hand-held milling machine
210 depth stop
215 screw connection
217 screw hole
211 through 211''' corresponding latching element
220 milling tool
230 receptacle
300 dust extraction system
500 milling system
ET penetration depth
OF surface
U circumferential direction of the suction nozzle
U' circumferential direction of the depth stop

What is claimed is:

1. A suction nozzle for a hand-held milling machine, the suction nozzle comprising: a suction connection designed for connection to a dust extraction system, the hand-held milling machine being equipped with a depth stop, a penetration depth of a milling tool of the hand-held milling machine limitable with aid of the depth stop; and an annular connection area, the suction nozzle being detachably fastenable via the annular connection area to the depth stop; wherein two oppositely situated latches are formed on the annular connection area; and wherein a first of the two oppositely situated latches is rigidly formed on the connection area, and a second of the two oppositely situated latches is elastically formed on the connection area with the aid of a spring element.

2. The suction nozzle as recited in claim 1 wherein the suction nozzle is detachably fastenable without tools to the depth stop.

3. The suction nozzle as recited in claim 1 further comprising at least one of the two oppositely situated latches being in engagement with an at least one corresponding latch of the depth stop when the connection area is fastened to the depth stop.

4. The suction nozzle as recited in claim 3 wherein at least one of the two oppositely situated latches is designed as a latching tab, and the at least one corresponding latch of the depth stop is designed as a recess.

5. The suction nozzle as recited in claim 1 wherein the connection area surrounds the milling tool or a receiving spindle in an annular manner when the connection area is fastened to the depth stop.

6. The suction nozzle as recited in claim 1 wherein the spring element is situated outside the connection area in a direction of the suction connection.

7. The suction nozzle as recited in claim 3 wherein the at least one corresponding latch includes four corresponding latching elements formed on the depth stop.

8. The suction nozzle as recited in claim 1 wherein at least one pressure compensation opening is provided on an outer circumference of the annular connection area.

9. The suction nozzle as recited in claim 1 wherein the suction nozzle is made from or includes a transparent plastic.

10. A milling system comprising:
a hand-held milling machine including an adjustable depth stop, a penetration depth of a milling tool of the hand-held milling machine limitable with aid of the depth stop; and
a suction nozzle including a suction connection designed for connection to a dust extraction system, and a connection area, the suction nozzle being detachably fastenable via the connection area to the depth stop in at least two different orientations.

11. The milling system as recited in claim 10 wherein the depth stop is detachably fastened or fastenable without tools to the hand-held milling machine with the aid of a screw connection.

12. The milling system as recited in claim 10 wherein the connection area is annular.

13. The milling system as recited in claim 11 wherein the connection area has two latching tabs and the depth stop is also annular and has four latching recesses to allow for the at least two different positions.

14. The milling system as recited in claim 10 wherein the connection area includes two latching elements and a spring connected to one of the latching elements.

15. The milling system as recited in claim 10 wherein the suction nozzle is connectable to the depth stop in at least four different orientations.

16. A method of using the milling system as recited in claim 10 comprising attaching the suction nozzle to the depth stop in a first orientation of the at least two different orientation and attaching the suction nozzle to the depth stop in a second orientation of the at least two different orientations.

17. The suction nozzle as recited in claim 1 wherein the annular connection area has a circular section sitting over the depth stop and a fully annular end piece connected to the circular section and having a smaller inner diameter than the circular section.

* * * * *